United States Patent
Suzuki et al.

(10) Patent No.: US 6,265,066 B1
(45) Date of Patent: Jul. 24, 2001

(54) WET FRICTION MATERIAL

(75) Inventors: Makoto Suzuki; Masahiro Mori; Hirokazu Yagi, all of Shizuoka (JP)

(73) Assignee: NSK-Warner Kabushiki Kaisha, Tokyo (JP)

(*) Notice: Subject to any disclaimer, the term of this patent is extended or adjusted under 35 U.S.C. 154(b) by 0 days.

(21) Appl. No.: 09/441,065

(22) Filed: Nov. 16, 1999

(30) Foreign Application Priority Data

Nov. 16, 1998 (JP) .................................................. 10-366002

(51) Int. Cl.⁷ ........................................................ C08J 5/14
(52) U.S. Cl. .......................... 428/391; 428/375; 428/391; 524/14; 524/15; 524/16; 524/492; 524/430; 523/149; 523/209; 523/216

(58) Field of Search .................................. 524/14, 15, 16, 524/492, 430; 106/36, 600; 442/179, 101; 523/148, 209; 428/375, 391

(56) References Cited

U.S. PATENT DOCUMENTS

| 5,563,196 | 10/1996 | Kitahara et al. ........................ 524/14 |
| 5,972,090 | * 10/1999 | Bremsblelage et al. . |
| 6,060,536 | 5/2000 | Matsumoto et al. ................. 523/156 |

* cited by examiner

Primary Examiner—Richard Weisberger
(74) Attorney, Agent, or Firm—Sughrue, Mion, Zinn, Macpeak & Seas, PLLC

(57) ABSTRACT

A wet friction material contains a fibrous base, a filler, a friction adjuster and a binder. The binder contains a material having siloxane bond. For example, the binder is a product of hardening of a hydrolytic solution of a silicon alkoxide.

18 Claims, 2 Drawing Sheets

WET FRICTION MATERIAL

FIELD OF THE INVENTION

The present invention relates to a wet friction material to be mounted in an oil-immersed frictional engagement apparatus such as clutch and brake in the automatic transmission of vehicles such as automobile.

DESCRIPTION OF THE INVENTION

An automatic transmission for vehicles such as automobile normally comprises a multi-plate clutch having a plurality of friction plates each having a metallic substrate (core plate) provided with a wet friction material thereon and separator plates each formed by a single metallic plate or the like as opposite friction material alternately arranged. In operation, these plates are pressed against or released from each other in ATF (automatic transmission fluid) as a lubricant to transmit or cut driving power.

As the wet friction material to be incorporated in such an oil-immersed frictional engagement apparatus there may be normally used a paper-based wet friction material called "paper friction material". This wet friction material is normally obtained by subjecting a fibrous base such as natural pulp fiber, organic synthetic fiber and inorganic fiber, a filler such as diatomaceous earth and cashew resin and a friction adjuster to wet paper making, impregnating the paper material thus obtained with a resin binder made of a thermosetting resin, and then heat-curing the material.

In the foregoing paper-based wet friction material, the thermosetting resin with which the paper material is impregnated as a resin binder not only plays a role of binding the fiber base and the filler but also exerts a great effect on the friction characteristics and abrasion resistance of the wet friction material. As such a resin binder there has heretofore been mainly used an unmodified phenolic resin, which exhibits an excellent heat resistance, a high mechanical strength and a relatively good abrasion resistance.

In recent years, the automobile industry is striving for the reduction of weight of various necessary parts and the enhancement of efficiency in quest of energy saving and weight reduction. On the other hand, the trend is for more automobile engines to be designed to operate at a higher speed and a higher output. Also in automobile transmission, it has been desired to improve the friction coefficient, heat resistance and durability of the wet friction material to keep up with the reduction of size and weight of frictional engagement apparatus and the enhancement of rotary speed and output of automobile engine. Further, the conventional wet friction material comprising an unmodified phenolic resin incorporated therein as a binder is disadvantageous in that it has a high crosslinking density. Thus, in the initial stage of operation, the conventional friction material exhibits a small friction coefficient due to local contact. Accordingly, as the operation proceeds, the friction surface is getting itself adapted to the opposite friction surface to show an increasing friction coefficient. As a result, the conventional wet friction material suffers; a drastic initial variation of friction coefficient. Moreover, under high temperature and humidity conditions, the conventional wet friction material suffers from seizing on the friction surface due to high temperature called heat spot on the opposite friction material (separator plate). Finally, the conventional wet friction material lacks prolonged stability of friction characteristics. Therefore, the conventional wet friction material leaves something to be desired.

In order to overcome these disadvantages, phenolic resins modified with various resins and resins other than phenolic resin such as silicone resins have been studied. Among these resins, silicone resins which have heretofore been studied are mainly composed of organochlorosilanes. These silicone resins exhibit an excellent heat resistance and durability due to siloxane bond in main skeleton. In addition, these silicone resins are available in a wide range of characteristics from flexible to rigid depending on the crosslinking density determined by the formulation and design of organosiloxanes as starting material. These silicone resins are excellent substitutes for phenolic resins as a binder for wet friction material. However, since these silicone resins normally undergo curing reaction at temperatures of as high as not lower than 200° C., they are not necessarily satisfactory from the standpoint of productivity and hence energy saving as compared with phenolic resins, which can be cured at a temperature of about 150° C. to 180° C. Thus, these silicone resins have never been put in practical use.

SUMMARY OF THE INVENTION

It is an object of the present invention to provide a wet friction material which exhibits an excellent heat resistance and durability, a high friction coefficient, a small initial variation of friction coefficient and an excellent heat spot resistance and can be cured at a relatively low temperature to make a great contribution to the enhancement of productivity and hence energy saving.

In order to solve the foregoing problems, the inventors made extensive studies of a hydrolytic solution of a silicon alkoxide. As a result, it was found that a hydrolytic solution of a silicon alkoxide not only exhibits the same excellent properties as the foregoing silicone resin but also can be cured at a relatively low temperature. In other words, it was found that a wet friction material comprising a fibrous base such as natural pulp fiber, organic synthetic fiber and inorganic fiber, a filler such as diatomaceous earth and cashew resin, a friction adjuster and a binder, the binder being a product of hardening of a hydrolytic solution of a silicon alkoxide, not only exhibits an excellent heat resistance and durability and a high friction coefficient but also can be cured at a relatively low temperature in the production process, thus attaining a far higher productivity than the conventional phenolic resin or the foregoing silicone resin. The present invention has thus been worked out.

Accordingly, the wet friction material according to the present invention comprises a fibrous base, a filler, a friction adjuster and a binder, wherein the binder is a product of hardening of a hydrolytic solution of a silicon alkoxide.

In the hydrolytic solution of a silicon alkoxide, the silicon alkoxide comprises tetrafunctional monomers or lower condensates thereof, singly or in admixture. In the hydrolytic solution of a silicon alkoxide, water is present in an amount of not less than the number of mols of silicon alkoxide and half the functional groups in silicon alkoxide is present in an amount of not more than hydrolyzable. Further, the hydrolytic solution of a silicon alkoxide is preferably adjusted acidic.

PREFERRED EMBODIMENTS OF THE INVENTION

Figure 1:
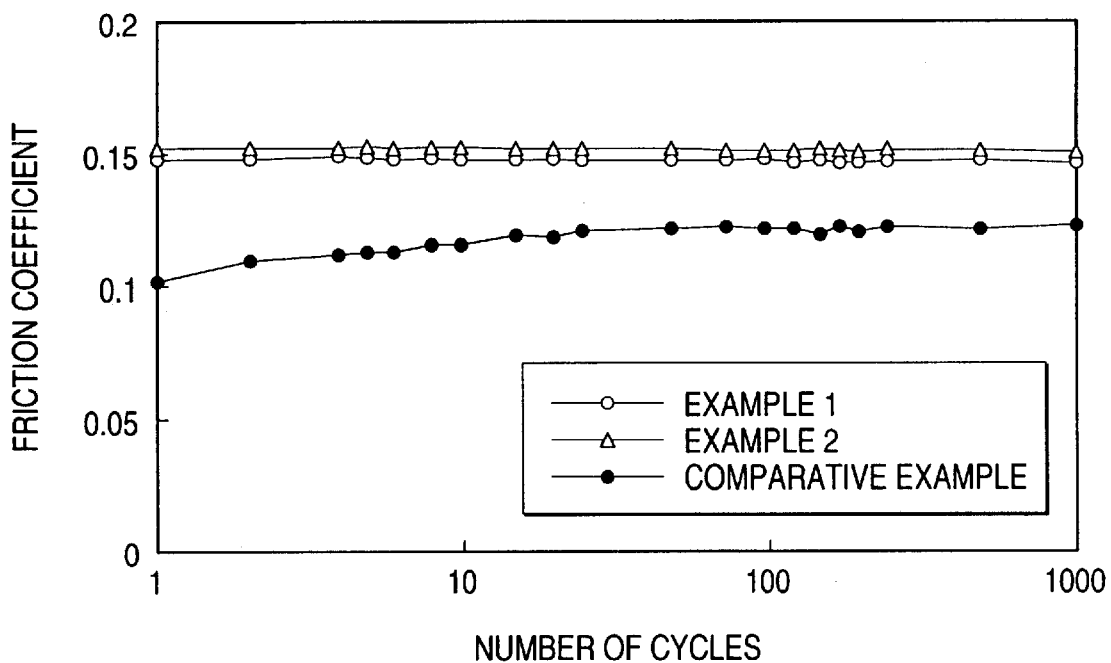
FIG. 1 is a graph illustrating how the friction coefficient changes in the initial cycles.

Embodiments of implication of the present invention will be further described hereinafter. A wet friction material according to the present invention contains a fibrous base, a filler, a friction adjuster and a binder, wherein as the binder there is used a product of hardening of a hydrolytic solution of a silicon alkoxide. That is, the binder contains a hydrolyte of a silicon alkoxide. As the fibrous base, there may be used a conventional material such as natural pulp fiber (e.g., wood pulp), organic synthetic fiber (e.g., aramide) and inorganic fiber (e.g., glass). As the filler or friction adjuster, there may be used a conventional material such as diatomaceous earth and cashew resin.

The binder to be used herein is a product of hardening of a hydrolytic solution of a silicon alkoxide. The silicon alkoxide to be used as a main starting material of the product of hardening of a hydrolytic solution of a silicon alkoxide can relatively easily react with water to form a heat-resistant siloxane bond (—O—Si—O—). In other words, the alkoxy group (—OR in which R is an alkyl group) undergoes substitution reaction with a hydroxyl group (—OH) to form a silanol group-containing compound. The silanol groups thus produced undergo dehydration condensation with each other to form a siloxane bond that causes polymerization. This mechanism of hydrolysis reaction depends greatly on which the solution is acidic or basic and thus affects the structure of the polymer thus produced or the stability of the hydrolytic solution. If the solution is basic, the first hydrolysis, i.e., reaction involving the substitution of one alkoxy group connected to silicon (Si) atom by a hydroxyl group, can hardly occur. However, once one alkoxy group has been substituted by a hydroxyl group, the rest of the alkoxy groups are rapidly substituted by hydroxyl groups. The resulting silanol group-containing compounds undergo repeated polycondensation with each other to produce a polymer having a high crosslinking density, making it easy to cause gelation at low temperatures. On the contrary, if the solution is acidic, the first hydrolysis occurs rapidly. However, the rest of the alkoxy groups is hydrolyzed slowly. In particular, if the starting material solution has a small water content, the hydrolysis reaction of the rest of the alkoxy groups doesn't proceed too much. Thus, the silanol groups which have been produced before the complete hydrolysis of the silicon alkoxide undergo repeated polycondensation with each other to produce a linear polymer having a low crosslinking density. By making the use of the foregoing characteristics of silicon alkoxide, a hydrolytic solution of a silicon alkoxide having a proper crosslinking density and polymerization degree and an excellent storage stability can be prepared.

In the present invention, the hydrolytic solution of a silicon alkoxide from which the binder is prepared can be obtained by a process of charging a silicon alkoxide as a main starting material, water, a solvent and an acid into a reaction vessel where they are then stirred at room temperature or a temperature of as relatively low as not higher than the boiling point of the solvent (lower alcohol), e.g., from about 40° C. to 50° C. for a predetermined period of time, e.g., about 3 hours.

Examples of the silicon alkoxide include tetrafunctional monomers such as tetramethoxysilane, tetraethoxysilane, tetrapropoxysilane and tetrabutoxysilane, and lower condensates thereof (e.g., dimer to hexamer). These silicon alkoxides may be used singly or in admixture. The starting material mixture is preferably diluted with a solvent so that the concentration of silicon alkoxide is reduced to not more than 80% by weight. If the hydrolytic solution has a concentration exceeding this value, it is disadvantageous in that the hydrolysis reaction and even the condensation reaction of the alkoxy group proceeds, occasionally impairing the storage stability of the hydrolytic solution.

The amount of water to be added is properly adjusted depending on the number of functional groups in the silicon alkoxide used or the concentration of silicon alkoxide in the starting material mixture. In some detail, the reaction solution is preferably such that the water content is not less than the number of mols of silicon alkoxide used and half the functional groups in the silicon alkoxide is present in an amount of not more than hydrolyzable. If the water content falls below the above defined value, the resulting hydrolytic solution comprises silicon alkoxides left unreacted and thus suffers from much loss during heat curing. The resulting hardened hydrolytic solution exhibits an insufficient heat resistance. On the contrary, if the water content exceeds the above defined value, the hydrolysis reaction and even the condensation reaction of alkoxy group proceeds, occasionally impairing the storage stability of the hydrolytic solution.

Although the solvent is not necessarily an essential component, it is normally used to make the silicon alkoxide and water homogeneously dispersible in the starting material mixture. As such a solvent, there may be mainly used a lower alcohol such as methanol, ethanol, propanol and butanol.

As the foregoing acid there may be used hydrochloric acid, sulfuric acid, nitric acid, acetic acid, hydrofluoric acid or the like. Such an acid is used to adjust the starting material mixture acidic, preferably to pH 3 or lower. When the starting material mixture is neutral or basic, a polymer having a high crosslinking density is produced, impairing the storage stability of the hydrolytic solution.

The number-average molecular weight of the polymer in the hydrolytic solution is preferably from about 500 to 3,000. If the number-average molecular weight of the polymer falls below 500, the resulting hydrolytic solution exhibits a reduced curability and thus needs to be heated to a high temperature to cure. On the contrary, if the number-average molecular weight of the polymer exceeds 3,000, the resulting hydrolytic solution exhibits a reduced penetrating power with respect to paper material, further impairing the storage stability of the hydrolytic solution. The ratio of the weight-average molecular weight to the number-average molecular weight, i.e., polydispersibility, of the polymer in the hydrolytic solution is preferably not more than 2. If the polydispersibility of the polymer exceeds 2, the hardening degree of the polymer in the hydrolytic solution varies, making it impossible to obtain a stable friction coefficient.

In order to produce the wet friction material of the present invention, a paper material is firstly formed. The foregoing paper material is obtained by subjecting a slurry solution containing a fibrous base such as natural pulp fiber (e.g., wood pulp), organic synthetic fiber (e.g., aramide) and inorganic fiber (e.g., glass), a filler such as diatomaceous earth and cashew resin and a friction adjuster dispersed in water at a predetermined ratio to ordinary paper making, and then drying the paper thus obtained. Thus, the paper material is not specifically limited. The paper material thus obtained is impregnated with the foregoing hydrolytic solution of a silicon alkoxide in an amount of from 30 to 120 parts by weight based on 100 parts by weight of the base, dried, and then heated and cured to a temperature of about 40° C. to 100° C. for 15 to 30 minutes to obtain a desired wet friction material. The wet friction material thus obtained can be punched to a predetermined shape, and then integrated to a substrate (core plate) coated with an adhesive under a hot press to obtain a friction plate. However, the present invention is not limited to this process. Other processes may be employed.

In the present invention, the hydrolytic solution of a silicon alkoxide undergoes hydrolysis reaction and even polycondensation reaction at a high rate due to the evaporation of the solvent and heating to finally form a hardened product having a siloxane bond in its main skeleton as in silicone resins. In this siloxane bond, the bond length between silicon atom and oxygen atom is great, giving a low electron density. Thus, the bond can easily rotate. The resulting hardened product is rich in flexibility. If such a hardened product of the hydrolytic solution of a silicon alkoxide is used as a binder for wet friction material, the resulting friction material exhibits an enhanced flexibility that increases the contact area thereof, eliminating the occurrence of- seizing called "heat spot" on the opposite material (separator plate) due to local contact. Further, the resulting friction material exhibits a slight initial variation of friction coefficient and hence a high stable friction coefficient. Moreover, the bond energy of Si—O in the siloxane bond is 106 kcal/mol, which is very higher than that of C—C bond constituting the main skeleton of organic resin such as phenolic resin. Because of its high bond energy, the product of hardening of a hydrolytic solution of silicon alkoxide can hardly undergo deterioration such as decomposition and discoloration even when kept at high temperatures over an extended period of time. Thus, the product of hardening of a hydrolytic solution of a silicon alkoxide is stable to frictional heat developed on the frictional sliding surface thereof, making it possible to drastically enhance the heat resistance and durability of the wet friction material.

EXAMPLES

The present invention will be further described in the following examples. However, these examples are only illustrative but doesn't restrict the scope of the present invention.

Preparation of Paper Material

A slurry solution containing 35% by weight of cellulose fiber and 20% by weight of aramide fiber as fiber base components and 45% by weight of diatomaceous earth as a friction adjuster/filler dispersed in water was subjected to paper making process, and then dried to obtain a paper material.

Example 1

To 152 parts by weight of tetramethoxysilane were added 116 parts by weight of methanol, 31 parts by weight of water and 5 parts by weight of a 0.01 N hydrochloric acid. The mixture was then allowed to undergo reaction at room temperature for 3 hours to obtain a hydrolytic solution of tetramethoxysilane. The foregoing paper material was impregnated with this solution, dried, and then heated and cured at a temperature of 70° C. for 30 minutes to obtain a wet friction material including a binder incorporated therein in an amount of 60 parts by weight based on 100 parts by weight of the paper material. The wet friction material thus obtained was punched to a ring having an outer diameter of 130 mm and an inner diameter of 100 mm which was then pressed against a ring-shaped metallic core plate in a mold which had been heated to a temperature of 200° C. at a pressure of 50 kg/cm$^2$ or higher for 30 seconds to form an integrated body. Thus, a friction plate having a diameter of 130 mm and a thickness of 2.3 mm was obtained.

Example 2

To 208 parts by weight of tetraethoxysilane were added 172 parts by weight of ethanol, 31 parts by weight of water and 5 parts by weight of a 0.01 N hydrochloric acid. The reaction mixture was then allowed to undergo reaction at a temperature of 40° C. for 3 hours to obtain a hydrolytic solution of tetraethoxysilane. The foregoing paper material was impregnated with this solution, dried, and then heated and cured at a temperature of 80° C. for 30 minutes to obtain a wet friction material containing a binder incorporated therein in an amount of 60 parts by weight based on 100 parts by weight of the paper material. The wet friction material thus obtained was then processed in the same manner as in Example 1 to obtain a friction plate having a diameter of 130 mm and a thickness of 2.3 mm.

Comparative Example

To 100 parts by weight of phenol were added 1,050 parts by weight of a 37% formalin and 10 parts by weight of a 20% caustic soda. The reaction mixture was then allowed to undergo reaction at a temperature of 100° C. for 1 hour. The reaction solution was then dehydrated under a pressure of 650 mmHg. When the temperature of the solution reached 70° C., 750 parts by weight of methanol were then added to the solution to obtain a liquid unmodified phenolic resin having a nonvolatile content of 50%. The resin thus obtained was then diluted with methanol. The foregoing paper material was impregnated with this resin solution, dried, and then heated and cured at a temperature of 150° C. for 30 minutes to obtain a wet friction material containing a resin incorporated therein in an amount of 40 parts by weight based on 100 parts by weight of the paper material. The wet friction material thus obtained was then processed in the same manner as in Example 1 to obtain a friction plate having a diameter of 130 mm and a thickness of 2.3 mm.

Evaluation Test (1) Initial variation of dynamic friction coefficient

Using a friction characteristics testing machine (SAE No. 2), the wet friction materials obtained in Examples 1 and 2 and Comparative Example were each measured for initial variation of dynamic friction coefficient under the testing condition 1 set forth in Table 1. The results are shown in FIG. 1.

TABLE 1

| Characteristics | Testing condition 1 |
| --- | --- |
| Rotary speed (rpm) | 3,600 |
| Inertia (kg · m) | 0.343 |
| Face pressure (kPa) | 785 |
| Oil temperature (° C.) | 100 |
| Amount of oil (cc) | 700 |

As can be seen in FIG. 1, the friction material of Comparative Example exhibits a small friction coefficient while the number of cycles is small but shows an increasing friction coefficient as the number of cycles increases until the friction coefficient reaches a constant value. On the other hand, the friction materials of Examples 1 and 2 show little or no initial variation of friction coefficient and subsequently show a constant friction coefficient which is greater than that of Comparative Example. In other words, the friction materials of these examples exhibit excellent initial drape characteristics and a great friction coefficient.

(2) Heat spot resistance test

Using a friction characteristics testing machine (SAE No. 2), the wet friction materials obtained in Examples 1 and 2 and Comparative Example were each examined for heat spot resistance under the testing condition 2 set forth in Table 2.

TABLE 2

| Characteristics | Testing condition 2 |
|---|---|
| Rotary speed (rpm) | 7,600 |
| Inertia (kg · m) | 0.123 |
| Face pressure (kPa) | 519.4 |
| Oil temperature (° C.) | 100 |
| Oil flow (L/min) | 0.075 |
| Number of cycles (times) | 5 |

Figure 2:
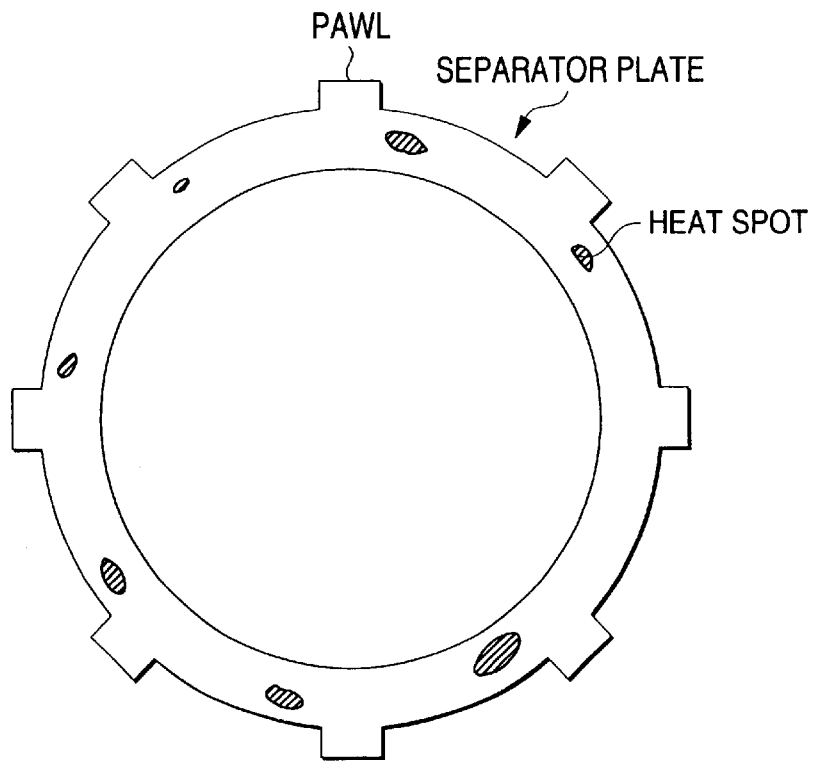
FIG. 2 is a front view of an opposite friction material which has been subjected to friction test with the friction material of Comparative Example under the conditions set forth in Table 2.
Figure 3:
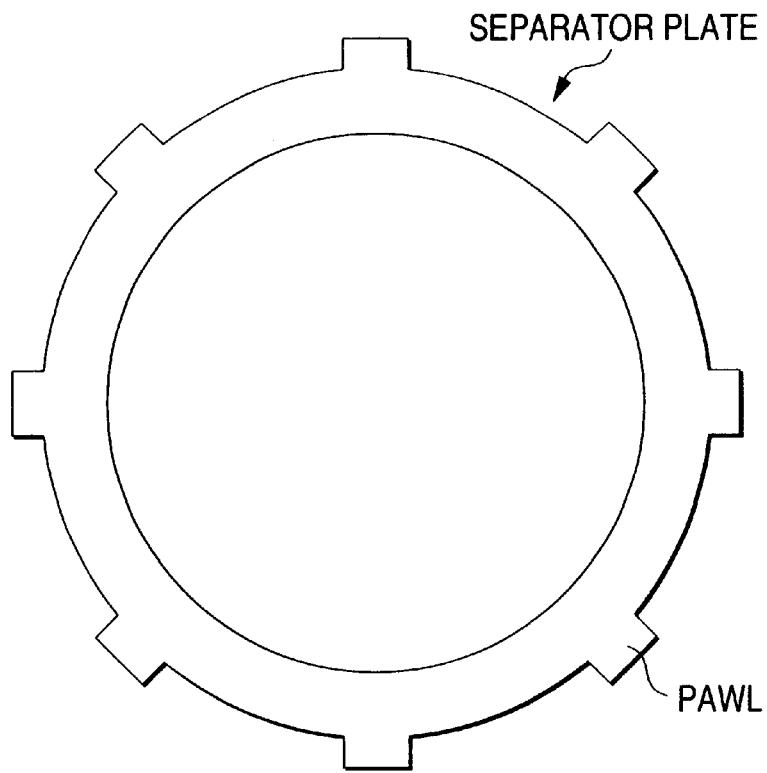
FIG. 3 is a front view of an opposite friction material which has been subjected to friction test with the friction materials of Examples 1 and 2 under the conditions set forth in Table 2.

FIG. 2 shows the conditions of the opposite material (separator plate) shown with the friction material of Comparative Example. FIG. 3 shows the conditions of the opposite material shown with the friction materials of Examples 1 and 2. As can be seen in FIG. 2, the friction material of Comparative Example showed a plurality of heat spots (blackening by seizing). As can be seen in FIG. 3, the friction materials of Examples 1 and 2 showed no heat spots. In other words, the use of the friction material of these examples makes it possible to exert an effect of inhibiting the occurrence of heat spots. One cycle consists of pressing and release.

(3) Durability test

Using a friction characteristics testing machine (SAE No. 2), the wet friction materials obtained in Examples 1 and 2 and Comparative Example were each evaluated for durability (life cycle) under the testing condition 3 set forth in Table 3 below. The results are shown in FIG. 4.

TABLE 3

| Characteristics | Testing condition 3 |
|---|---|
| Rotary speed (rpm) | 7,600 |
| Inertia (kg · m) | 0.123 |
| Face pressure (kPa) | 519.4 |
| Oil temperature (° C.) | 100 |
| Oil flow (L/min) | 0.36 |

Figure 4:
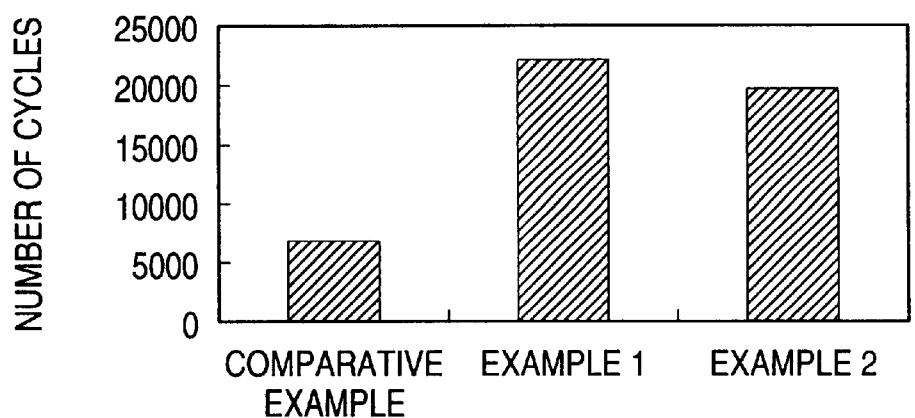
FIG. 4 is a graph illustrating the comparison of the duration of life of friction materials.

As can be seen in FIG. 4, the wet friction materials of Examples 1 and 2 exhibit a prolonged duration of life as compared with that of Comparative Example.

As mentioned above, in accordance with the wet friction material of the present invention, the hydrolytic solution of a silicon alkoxide can be cured at a much lower temperature than for the conventional phenolic resin and silicone resin and thus can exert an extremely great effect of contributing to the enhancement of productivity and energy saving. Further, the wet friction material containing as a binder a product of hardening of a hydrolytic solution of a silicon alkoxide incorporated therein not only exhibits a far higher heat resistance and durability than the conventional unmodified phenolic resin, etc. but also can have an enhanced flexibility than the unmodified phenolic resin and thus can provide drastic improvements in initial drape and resistance to heat spot due to local contact. Further, the wet friction material according to the present invention can sufficiently keep up with the recent tendency towards the reduction of size and weight of frictional engagement apparatus in automatic transmission and the enhancement of rotary speed and output of automobile engine.

What is claimed is:

1. A wet friction material comprising a fibrous base, a filler, a friction adjuster and a binder, said binder comprising a material having siloxane bond.

2. The wet friction material according to claim 1, wherein said binder comprises a hydrolyte of a silicon alkoxide.

3. The wet friction material according to claim 1, wherein said binder is a product of hardening of a hydrolytic solution of a silicon alkoxide.

4. The wet friction material according to claim 3, wherein the silicon alkoxide in said hydrolytic solution of a silicon alkoxide comprises at least one kind of tetrafunctional monomers and lower condensates thereof.

5. The wet friction material according to claim 3, wherein, in the hydrolytic solution of a silicon alkoxide, water is present in an amount of not less than the number of mols of silicon alkoxide and half the functional groups in silicon alkoxide is present in an amount of not more than hydrolyzable.

6. The wet friction material according to claim 3, wherein said hydrolytic solution of a silicon alkoxide is adjusted acidic.

7. The wet friction material according to claim 1, said friction adjuster comprising material having diatomaceous earth and cashew resin.

8. The wet friction material according to claim 3, wherein said hydrolytic solution comprises a concentration of silicon alkoxide of no more than 80% by weight.

9. The wet friction material according to claim 3, wherein said hydrolytic solution of a silicon alkoxide comprises a polymer, and in said hydrolytic solution of a silicon alkoxide, the ratio of the weight-average molecular weight to the number-average molecular weight of said polymer does not exceed 2.

10. The wet friction material according to claim 3, wherein said hydrolytic solution of a silicon alkoxide comprises a polymer having a number-average molecular weight from 500 to 3,000.

11. A wet friction material comprising a fibrous base, a filler and a binder, said binder comprising a material having a siloxane bond, wherein said material having the siloxane bond comprises a hydrolyte of a silicon alkoxide.

12. The wet friction material according to claim 11, wherein said binder is a product of hardening of a hydrolytic solution of a silicon alkoxide.

13. The wet friction material according to claim 11, wherein the silicon alkoxide in said hydrolytic solution of a silicon alkoxide comprises at least one kind of tetrafunctional monomers and lower condensates thereof.

14. The wet friction material according to claim 11, wherein, in the hydrolytic solution of a silicon alkoxide, water is present in an amount of not less than the number of mols of silicon alkoxide and half the functional groups in silicon alkoxide is present in an amount of not more than hydrolyzable.

15. The wet friction material according to claim 11, wherein said hydrolytic solution of a silicon alkoxide is adjusted acidic.

16. The wet friction material according to claim 11, wherein said hydrolytic solution comprises a concentration of silicon alkoxide of no more than 80% by weight.

17. The wet friction material according to claim 11, wherein said hydrolytic solution of a silicon alkoxide comprises a polymer, and in said hydrolytic solution of a silicon alkoxide, the ratio of the weight-average molecular weight to the number-average molecular weight of said polymer does not exceed 2.

18. The wet friction material according to claim 11, wherein said hydrolytic solution of a silicon alkoxide comprises a polymer having a number-average molecular weight from 500 to 3,000.

* * * * *